United States Patent
Sarlioglu et al.

(10) Patent No.: US 7,466,106 B2
(45) Date of Patent: Dec. 16, 2008

(54) SYSTEM AND METHOD FOR DC POWER GENERATION FROM A RELUCTANCE MACHINE

(75) Inventors: Bulent Sarlioglu, Torrance, CA (US); Colin E. Huggett, Longmont, CO (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/924,839

(22) Filed: Oct. 26, 2007

(65) Prior Publication Data

US 2008/0061747 A1  Mar. 13, 2008

Related U.S. Application Data

(62) Division of application No. 11/268,486, filed on Nov. 8, 2005, now Pat. No. 7,307,403.

(51) Int. Cl.
*H02P 3/00* (2006.01)
*H02P 9/06* (2006.01)
*H02P 15/00* (2006.01)

(52) U.S. Cl. ........................................ 322/11
(58) Field of Classification Search .......... 322/11
See application file for complete search history.

(56) References Cited

U.S. PATENT DOCUMENTS

| | | | |
|---|---|---|---|
| 5,404,091 A | 4/1995 | Radun | 322/94 |
| 5,428,275 A | 6/1995 | Carr et al. | 318/146 |
| 5,512,811 A | 4/1996 | Latos et al. | 322/10 |
| 5,703,421 A | 12/1997 | Durkin | 310/61 |
| 5,780,997 A | 7/1998 | Sutrina et al. | 322/29 |
| 5,850,133 A | 12/1998 | Heglund | 318/700 |
| 6,011,377 A | 1/2000 | Heglund et al. | 318/701 |
| 6,365,983 B1 * | 4/2002 | Masberg et al. | 290/40 C |
| 6,467,725 B1 | 10/2002 | Coles et al. | 244/58 |
| 6,590,360 B2 * | 7/2003 | Hirata et al. | 318/727 |
| 6,800,953 B2 * | 10/2004 | Blackburn et al. | 290/37 A |
| 6,831,439 B2 * | 12/2004 | Won et al. | 318/701 |
| 6,847,194 B2 | 1/2005 | Sarlioglu et al. | 322/10 |
| 6,889,419 B2 * | 5/2005 | Reiter et al. | 29/596 |
| 6,960,900 B2 | 11/2005 | Fogarty et al. | 322/29 |
| 7,146,708 B2 * | 12/2006 | Reiter et al. | 29/598 |
| 7,227,271 B2 | 6/2007 | Anghel et al. | 290/31 |
| 7,230,344 B2 * | 6/2007 | Pollack et al. | 290/40 C |

(Continued)

*Primary Examiner*—Quyen P Leung
*Assistant Examiner*—Pedro J Cuevas
(74) *Attorney, Agent, or Firm*—Oral Caglar, Esq.

(57) ABSTRACT

A system and method is provided for generating DC power using a synchronous reluctance machine (12) or a salient-pole synchronous machine (102) and a power converter (110). The present invention can be used to achieve power production for a synchronous reluctance machine (12), or can be used to achieve partial production of power from a traditional salient-pole synchronous machine/starter (102) in the case where the salient-pole synchronous machine/starter has degenerated into a synchronous reluctance machine due to, for example, a loss of excitation. In a power generation system, a control system and method can include a power converter (110), controlled by a voltage command and at least one of a measured DC link (120) voltage or DC link (120) current, for use with a synchronous reluctance machine armature winding (102A) and a prime mover (116), such that movement of the synchronous reluctance machine rotor of the synchronous reluctance machine can be used to produce at least partial DC power generation.

20 Claims, 5 Drawing Sheets

U.S. PATENT DOCUMENTS

2003/0011347 A1* 1/2003 Kaplan et al. ................. 322/24
2003/0192169 A1* 10/2003 Reiter et al. ................. 29/607
2005/0028351 A1* 2/2005 Reiter et al. ................. 29/598

* cited by examiner

SYSTEM AND METHOD FOR DC POWER GENERATION FROM A RELUCTANCE MACHINE

CROSS-REFERENCE TO RELATED APPLICATIONS

This application is a divisional application Ser. No. 11/268,486 filed Nov. 8, 2005.

FIELD OF THE INVENTION

The present invention relates to a control system and method for achieving DC power generation from a synchronous reluctance machine. More specifically, the present invention relates to a control system and method to achieve DC power production from a synchronous reluctance machine or partial DC power production from a traditional salient-pole synchronous machine/starter in the case where the salient-pole synchronous machine/starter has degenerated into a reluctance machine.

BACKGROUND OF THE INVENTION

Aircraft electrical power systems have increasingly required the development of systems which can provide larger and larger electrical supplies under both normal and abnormal conditions. As noted in U.S. Pat. No. 6,467,725 issued to Coles et al., the entire disclosure of which is incorporated herein by reference, a greater dependence on electrical power requires an electrical supply that is available at all times that an aircraft is in service.

As noted in the Coles Patent, emergency electrical power in the event of engine failure has been traditionally provided by auxiliary devices, such as a ram air turbine (RAT), which comprises an electrical generator equipped with a propeller. The RAT is normally stored within the fuselage of an engine and is deployed into the air stream surrounding the aircraft when required. The resulting flow of air over the RAT causes a propeller to rotate, thereby generating electrical power. Unfortunately, several such devices may be required in order to ensure sufficient power is available in the event of total engine failure which can incur significant additional weight to the system.

The Coles Patent addresses the problems disclosed above through the incorporation of a "windmill" effect applied to a bypass fan and a generator. As pointed out in the Coles Patent, it is known that in a multistage high bypass gas turbine engine, the low pressure shaft (LP) or low speed spool which drives the low pressure compressor and the bypass fan will continue to rotate in the event of engine failure because of a "windmill" effect created by the airflow resulting from the motion of the aircraft. The energy of the fan is then extracted by a generator connected to the low pressure shaft, and is then used to supply electrical power to the aircraft during periods of failure.

Where engine failure does not occur, of equal concern is the failure of systems or components in the power generation system. Such a power generation system typically includes a permanent magnet generator, an exciter salient-pole synchronous machine, and a main salient-pole synchronous machine coupled with a prime mover, such as a gas turbine engine. During normal operation, the permanent magnet machine provides rectified power to an exciter regulator, which in turn controls an exciter field current that produces a rotating multi-phase voltage. This multi-phase voltage is rectified to produce a main machine field current and the resultant flux produced by this field current produces a voltage at the stator windings of the main machine. Regulation of the output voltage is achieved by comparing the output voltage to a pre-determined reference and adjusting the exciter field winding.

However, the loss of excitation power to the main machine can be caused by the failure of any system or component noted above, including the armature of the PM generator, the diodes of the multiphase rectifier which serve to rectify the output of the armature voltages of the PM generator, the exciter regulator (i.e. semiconductor switches), the generator control unit (GCU), the field and armature of the exciter machine, the diodes of the multiphase rotating rectifier, and the field winding of the machine.

The loss of excitation prevents the production of a main field flux in the main machine, and as a consequence, the machine can not produce any electrical power. Accordingly, there is a need for a system and method to control a power generation system to provide at least partial power generation capability by using a reluctance machine generally, and in a specific example, by using the reluctance power of the salient-pole synchronous generator where the prime mover is operational but the main field flux is lost. Furthermore, there is also a need for a system and method to simplify the traditional generation system by utilizing only one electrical machine which can eliminate the need for other electrical machines such as PM and exciter machines of the traditional aircraft generation system.

Accordingly, a need exists for a system and method which enables DC power generation from a synchronous reluctance machine, including the specific example of a salient-pole synchronous machine where the prime mover is operational but excitation is lost (essentially resulting in a synchronous reluctance machine).

SUMMARY OF THE INVENTION

Accordingly, the present invention has been made to substantially solve the above and other problems, and to provide other benefits. An object of exemplary embodiments of the present invention therefore, is to provide a power generation control system and method for power generation using a synchronous reluctance machine.

Another object of exemplary embodiments of the present invention is to provide a power generation control system and method to simplify the traditional generation system by utilizing only a synchronous reluctance machine to eliminate the need for other electrical machines of the traditional aircraft generation system.

Another object of exemplary embodiments of the present invention is to provide a power generation control system and method for partial power generation using the reluctance power of a salient-pole synchronous generator where a prime mover is operational, but where the salient-pole synchronous generator has degenerated into a synchronous reluctance machine.

Another object of exemplary embodiments of the present invention is to provide a power generation control system and method that can be used with a main machine armature winding engaged with a rotor, such that in the event that excitation is lost, movement of the rotor produces at least partial power generation using the reluctance power of a main machine.

In accordance with an embodiment of the present invention, a control system and method and a synchronous reluctance machine are gainfully used to achieve DC electric power generation system as well as prime mover startup, such as for a gas engine in an aircraft. Embodiments of the present invention comprise a control system and method for achieving power generation using a synchronous reluctance machine and for providing at least partial power generation using a traditional salient-pole synchronous machine in the case where a loss of excitation of the main machine occurs. Embodiments of the present invention comprise a synchronous reluctance or salient-pole synchronous machine, a power inverter, and associated control electronics to control reluctance power production of the synchronous reluctance machine or degenerated salient-pole synchronous machine. Since embodiments of the present invention operate with no field winding, the need for a PM generator, exciter machine and associated power electronics and control systems for the exciter of the traditional system is eliminated. In doing so, embodiments of the present invention can reduce the size, weight and cost of the power generation system for some applications. A higher mean time between failures value for the overall system can also be achieved. Additional benefits include the elimination of heat generation due to copper losses and conduction losses of rotating diodes in the rotor.

By utilizing the power generation capability of a synchronous reluctance machine or a resulting synchronous reluctance machine (for example, in the case where a salient-pole synchronous generator has degenerated into a synchronous reluctance machine) where essentially there is no field winding, the need for or dependence upon the permanent magnet generator, exciter machine, exciter power supply and inverter (in the case where prime mover start-up will also be done using only reluctance), the GCU and rotating diode rectifier, can be eliminated. This provides a simple power generation and start up system, as no field excitation of the exciter machine or additional control for field adjustments are required. Embodiments of the present invention can be successfully implemented and provide a lower weight, size and cost, and higher reliability mean time between failures (MTBF) of aircraft power generation systems for a wide range of aircraft, from small to large transport and military aircraft. Additional benefits include a decreased overall space requirement for supporting electronics, as well as the elimination of additional weight and heat generation.

BRIEF DESCRIPTION OF THE DRAWINGS

These and other objects, advantages and novel features of the present invention will become more readily appreciated from the following detailed description when read in conjunction with the accompanying drawings, in which.

Throughout the drawings, like reference numbers should be understood to refer to like elements, features and structures.

DETAILED DESCRIPTION OF EXEMPLARY EMBODIMENTS

Exemplary embodiments of the present invention comprise a control system and method for achieving power generation using a synchronous reluctance machine or for achieving at least partial power generation using a traditional salient-pole synchronous machine in the case where a loss of excitation of the main machine occurs. Exemplary embodiments of the present invention comprise a synchronous reluctance or salient-pole synchronous machine, a power inverter, and associated control electronics to control reluctance power production of the synchronous reluctance machine or degenerated salient-pole synchronous machine.

A synchronous reluctance machine can be defined as an electrical machine where there is no field winding or permanent magnet in its rotor, but it has a saliency in its so called d- and q-axis reactances. The stator can be wound with three or more phase sinusoidally distributed windings. In the following exemplary implementations, embodiments of the present invention are used to achieve power generation using a synchronous reluctance machine generally, and in an exemplary application, to achieve partial production of DC power from a traditional salient-pole synchronous machine/starter in the case where the salient-pole synchronous machine/starter has degenerated into a synchronous reluctance machine. The DC power can be utilized to power other loads in an application, such as in an aircraft. That is, the exemplary application illustrates the use of an embodiment of the present invention with a traditional salient-pole synchronous generator system where there has been a loss of the main field flux. However, embodiments of the present invention are equally applicable to achieve power production for any synchronous reluctance machine.

Figure 1:
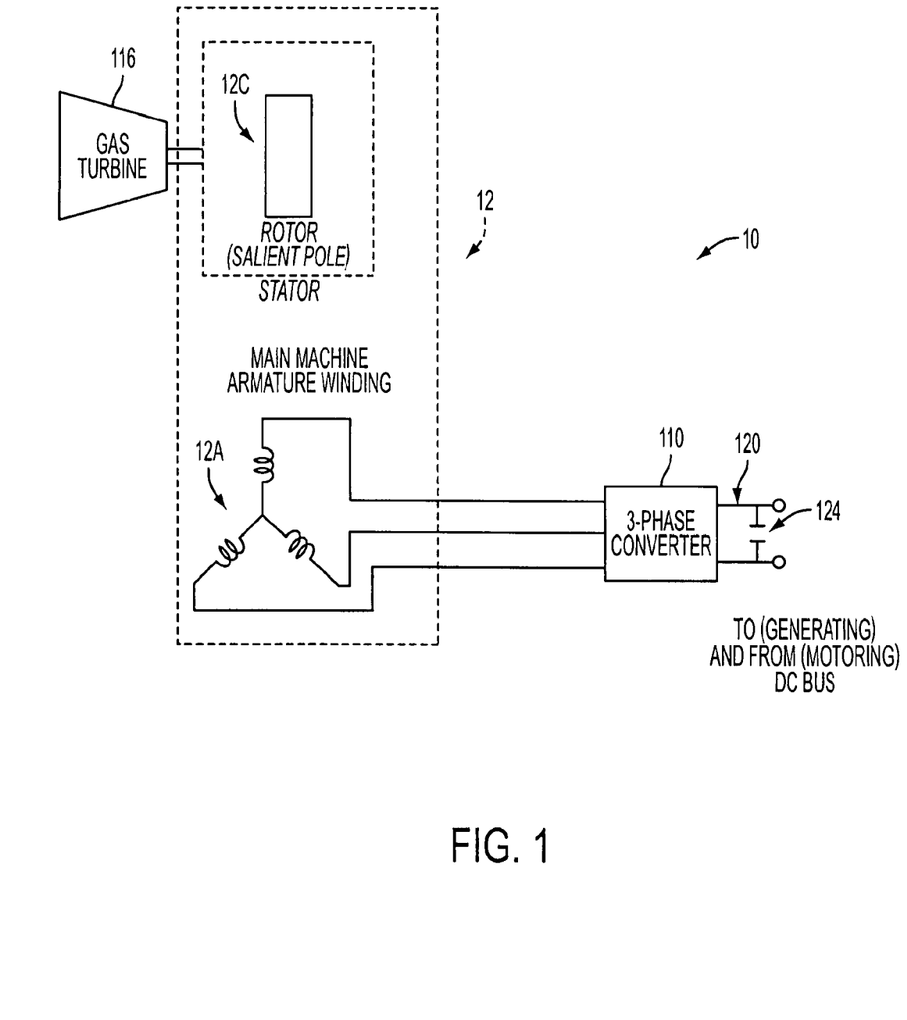
FIG. 1 is a block diagram illustrating an example of a synchronous reluctance machine, and which further reflects an example of a salient-pole synchronous machine that has had a failure in the excitation method and reverted to a synchronous reluctance machine, and to which an exemplary embodiment of the present invention can be applied.

FIG. 1 is a block diagram illustrating an example of a synchronous reluctance machine, and which further reflects a salient-pole synchronous machine that has degenerated into a synchronous reluctance machine due to excitation loss, and to which an exemplary embodiment of the present invention can be applied. The system (10) of FIG. 1 comprises a prime mover (116), such as a gas turbine engine, an electrical machine (12), such as a synchronous reluctance machine for generating and motoring the prime mover (116), a 3-phase converter (110) for providing a DC voltage, and a DC bus (120) to a DC load (not shown). The system can further comprise other general electronics, such as a filter capacitor (124) coupled between the leads of the DC bus (120). The electrical machine (12) typically comprises a main synchronous reluctance machine having a armature winding (12A) electrically coupled to the 3-phase converter (110), and a salient pole rotor (12C). The system (10) of FIG. 1 does not require a PM generator, exciter machine, exciter regulator, rotating rectifier, field winding, and GCU.

In FIG. 1, there is no field winding of the synchronous reluctance machine (12). However, as described in greater detail below, a rotor saliency is present.

In accordance with an exemplary embodiment of the present invention, a portion of the rated power supply can be generated using the reluctance of the synchronous reluctance machine (12) where the prime mover (116) is operational. This allows the use of embodiments of the present invention to provide critical power requirements of an aircraft, which can be of particular importance as more electric power is used for various aircraft functions in the future. A specific implementation of an exemplary embodiment of the present invention will now be described in greater detail. Although FIG. 1 illustrates a general synchronous reluctance machine (12) to which an exemplary embodiment of the present invention can be applied, a more clear understanding of the present invention can be illustrated using a traditional salient-pole synchronous machine in the case where a loss of excitation of the main machine occurs.

As noted above, embodiments of the present invention are equally applicable to a traditional salient-pole synchronous machine in the case where a loss of excitation of the main machine occurs. This exemplary application is described in greater detail with reference to FIGS. 2-5, but is not limited thereto. The following embodiments of the present invention are applicable with substantially the same results to the general synchronous reluctance machine of FIG. 1.

Figure 2:
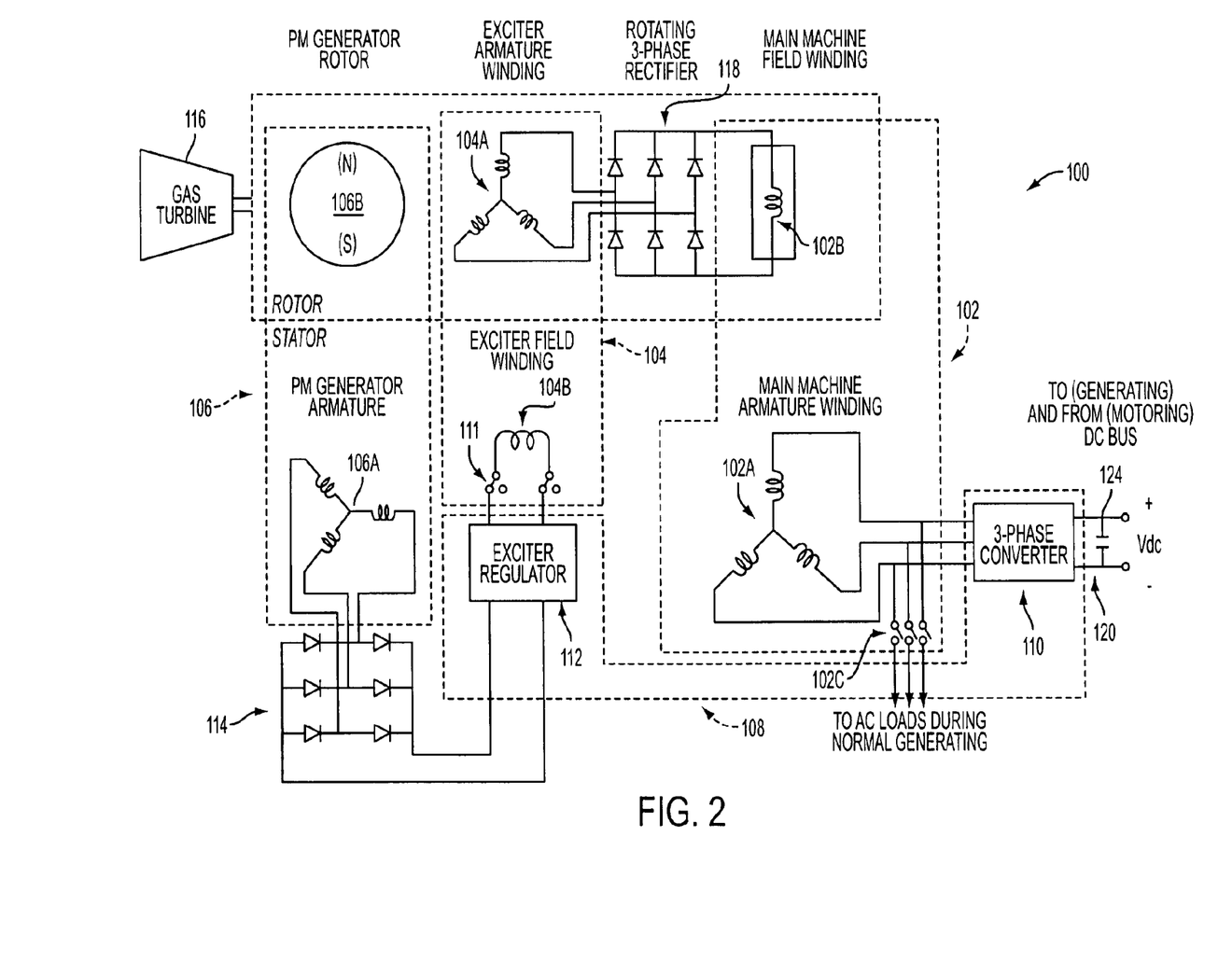
FIG. 2 is a block diagram illustrating an example of a conventional salient-pole synchronous machine prior to degeneration, and to which an exemplary embodiment of the present invention can be applied.

FIG. 2 is a block diagram illustrating an example of a salient-pole synchronous machine prior to degeneration and to which an exemplary embodiment of the present invention can be applied. In FIG. 2, a block diagram illustrating an example of a system (100) for generating and motoring a prime mover, such as a gas turbine engine, is shown. The system requires a three phase converter and associated control system to provide DC power. The system (100) of FIG. 1 comprises at least three electrical machines (102), (104) and (106), the prime mover (116) such as a gas turbine as described in FIG. 1, and an active and passive power electronics circuit (108). The three electrical machines typically comprise a permanent magnet (PM) generator (106), an exciter salient-pole synchronous machine (104), and a main salient-pole synchronous machine (102). As shown in FIG. 2, the main machine, or starter/generator (S/G) (102), exciter (104), and PM generator (106), are arranged to allow multiple modes of operation, as described in greater detail below.

The system (100) also comprises the main machine (3-phase) converter (110) as described in FIG. 1, a multiphase rectifier (114) electrically coupled between the PM generator (106) and exciter (104), a multiphase rotating rectifier (118) electrically coupled between the armature (104A) of the exciter (104) and field (102B) of the main machine (102), and associated control circuit (or exciter regulator) (112) for the exciter portion, where the plural phase converter (110) and the exciter regulator (112), operate in cooperation as the active and passive power electronics circuit (108).

The first multiphase rectifier (114) is electrically coupled to the armature winding (106A) of the PM generator (106) and to the field winding (104B) of the exciter (104) via the exciter regulator (112). The second multiphase rectifier (118) is located on the rotor of the main machine (102) and is electrically coupled to the armature winding (104A) of the exciter (104) and to the field winding (102B) of the main machine (102). The main machine converter (110) is electrically coupled to the armature winding (102A) of the main machine (102), AC load lines (102C) and the DC bus (120). The filter capacitor (124) can be coupled between the leads of the DC bus (120) as described in FIG. 1 and can be used to provide a voltage measurement as described in greater detail below.

As can be seen from FIG. 2, in order to achieve field current in the rotor of the main machine, there are many processes involved, each of which can be subject to numerous component and system failures. When systems are fully functional, the permanent magnet machine (106) provides rectified power to the exciter regulator (112), which in turn controls the exciter field current that produces a rotating multi-phase voltage. This multi-phase voltage is rectified by the multiphase rotating rectifier (118) to produce a main machine field current in the field (102B), and the resultant flux produced by this field current produces a voltage at the stator windings (102A) of the main machine (102). Regulation of the output voltage is achieved by comparing the output voltage to a pre-determined reference, and adjusting the exciter field winding using the exciter regulator (112). However, the loss of excitation power to the main machine (102) can be caused by the failure of several systems and components, including the armature (106A) of the PM generator (106), the diodes of the multiphase rectifier (114) which serve to rectify the output of the armature voltages of the PM generator (106), the exciter regulator (112) (i.e. semiconductor switches), the generator control unit (GCU) (not shown), the field (104B) and armature (104A) of the exciter machine (104), the diodes of the multiphase rotating rectifier (118), and the field winding (102B) of the machine (102).

The result of such component and system failures can be illustrated by an equivalent synchronous reluctance machine model as shown in FIG. 1. That is, the system (100) of FIG. 2 degenerates into the system (10) of FIG. 1. In FIG. 1, the block diagram (10) illustrates a synchronous reluctance machine (12), and also illustrates an example of the salient-pole synchronous machine system (100) in which the PM generator (106), exciter (104), power electronics circuit (108), rectifier (118) or field winding (102B) have been disabled. The prime mover (116) is still operational however.

In FIG. 1, there is no current in the field winding of the machine. However, as described in greater detail below, a rotor saliency is present. In FIG. 1, the system (10) comprises the main machine armature winding (12A) and rotor (12C), corresponding to the main machine rotor and armature winding (102A) in FIG. 2. The system (10) further comprises the main machine converter (110), but does not include the AC bus load during the generation mode. The filter capacitor (124) is coupled between the leads of the DC link or bus (120) and can be used to provide a DC link voltage measurement.

In accordance with an exemplary embodiment of the present invention, a portion of the rated power supply can be generated using the reluctance of the salient machine (12) where the prime mover (116) is operational, even using the main salient-pole synchronous machine (102) in cases of a main field loss for any reason. This allows the use of embodiments of the present invention to provide critical power requirements of the aircraft, which can be of particular importance as more electric power is used for various aircraft functions in the future.

As noted above, an implementation of an exemplary embodiment of the present invention can preferably occur where the prime mover (116) is operational, but where there is a main field loss. The detection of prime mover (116) operation can be achieved by any number of techniques as known to those skilled in the art, such as by checking the speed of the prime mover output shaft for rotation. Returning to the example implementation of FIG. 1, if the shaft of the prime mover (116) is rotating and yet there is no field current, a controller in accordance with an embodiment of the present invention initiates a control scheme for the system as described in greater detail below.

The system (100) of FIG. 2 can operate normally in several modes, such as a generation mode, and motoring mode to start-up the prime mover. During generation, the permanent magnet machine (106) provides rectified power to the exciter regulator (112), which in turn controls the exciter field current that produces a rotating multi-phase voltage. This multi-phase voltage is rectified to produce a main machine field current, and the resultant flux produced by this field current produces a voltage at the stator windings. Where the excitation power is lost, the main machine (102) is limited to substantially reluctance power production only, that is, electrical power generated by reason of the different magnetic reluctance between the so called direct and quadrature axes of the salient-pole rotor of the synchronous machine (102), and the control of a power converter applied to the terminals of the machine.

However, as noted above, FIG. 1 also applies to a generation system where only a synchronous reluctance machine is used for power generation. The same motor can also be used for motoring to start-up the prime mover.

Figure 3:
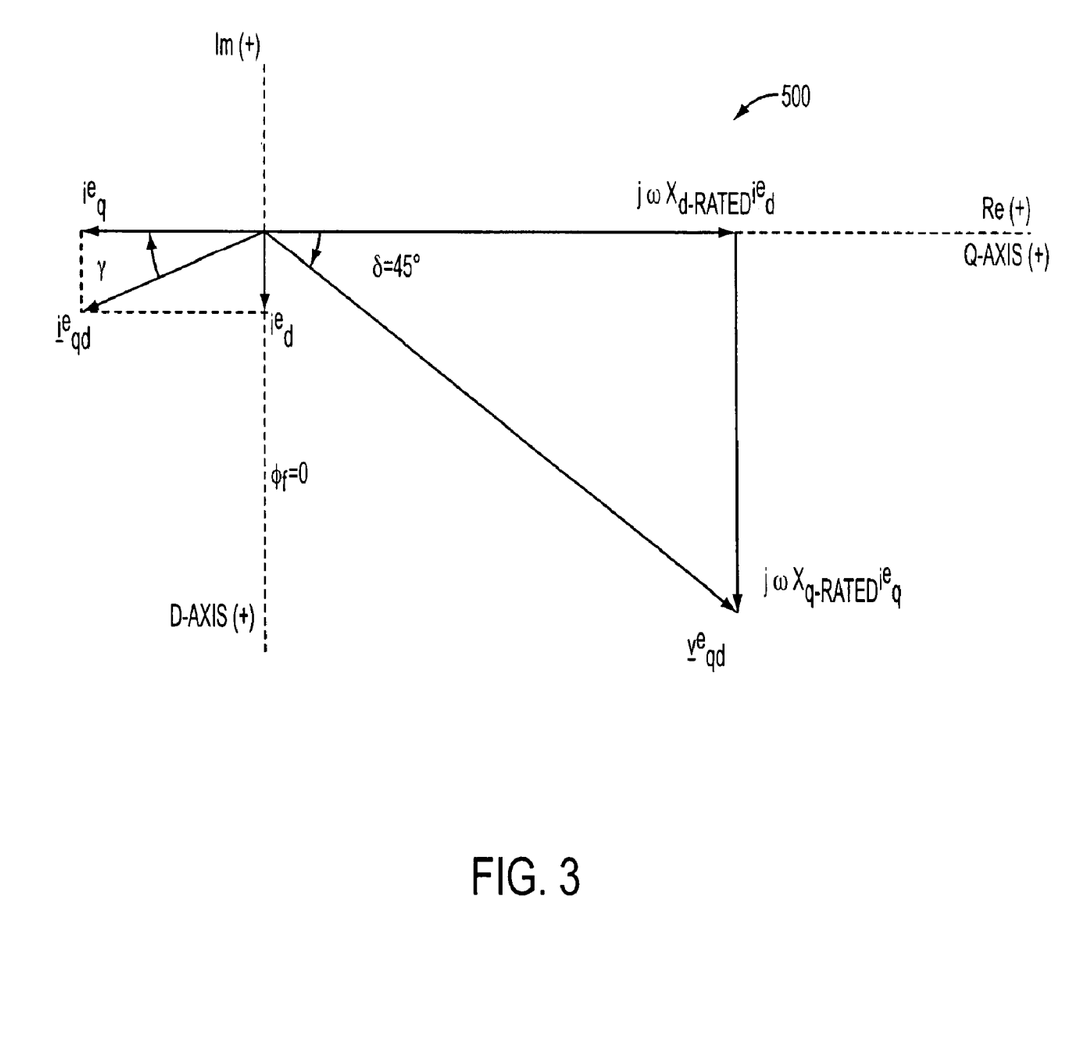
FIG. 3 is a vector diagram illustrating an example of power production of a synchronous reluctance machine or of a salient-pole synchronous machine wherein excitation is lost, in accordance with an embodiment of the present invention.

As shown in FIG. 3, the generation mode of operation of the main machine (102) where the excitation power is lost, can be obtained by applying a terminal voltage vector $V_t$, synchronous with the rotation of the rotor of the machine (102), to the machine terminals, such that the terminal voltage vector $V_t$ lags the q-axis of the machine (102). As shown in the vector diagram (500) of FIG. 3, the terminal voltage $V_t$ can be at a selected angle with respect to the q-axis current of the main machine (102), for example 45 electrical degrees. The per unit (pu) power obtained by the reluctance component of the salient-pole machine (102) can then be described, neglecting the copper loss, in the following equation (1) below, $$P = -\left[\sin 2\delta \frac{(X_d - X_q)V^2}{2X_d X_q}\right] \quad (1)$$

wherein $\delta$ is the load angle, $X_d$ is the per unit d-axis synchronous reactance, $X_q$ is the per unit q-axis synchronous reactance, and V is the per unit voltage applied to the terminals of the machine (102).

The saliency of the rotor, or ratio of d-axis and q-axis synchronous reactance, can be described as shown in the following equation (2) below, $$K = \frac{X_d}{X_q} \quad (2)$$

and, where K is greater than 1, in which a higher saliency ratio is desired, the per unit power obtained by the reluctance component of the salient-pole synchronous machine (102) can be described in the following equation (3) below, $$P = -\left[\sin 2\delta \frac{K\left(1 - \frac{1}{K}\right)V^2}{2X_d}\right] \quad (3)$$

In equation (3), P is positive if the machine is in a motoring mode (i.e. $\delta$ is negative), and P is negative if it is generating, or in a generating mode (i.e. $\delta$ is positive). For V=1 pu, and $\delta$=45 degrees in equation (3), the power of the system can be calculated for several saliency ratios, as shown in Table 1 by way of example, using equation (4) below.

$$P = -\left[\frac{K\left(1 - \frac{1}{K}\right)}{2X_d}\right] \quad (4)$$

As can be seen in Table 1, the greater the saliency ratio, the greater the power output obtained by the reluctance component of the synchronous reluctance or salient-pole synchronous machine (102). As there is no field current, there are no copper losses in the rotor of the main machine (102) in this mode of operation.

TABLE 1

| K (saliency ratio) | Power (P = f(1/$X_d$)) |
| --- | --- |
| 1.5 | $-0.25/X_d$ |
| 3 | $-1/X_d$ |

A control system to implement the various operational modes described above can require knowledge of the rotor operation and position, and can further require the current vector applied to the armature winding (102A) of the main machine (102) to be maintained at a fixed angle with respect to the rotor position. One example of such a control system in accordance with an embodiment of the present invention is presented in FIG. 4 and discussed in greater detail below In FIG. 4, a control block diagram of a controller (600) is shown in accordance with an embodiment of the present invention. In the controller (600), a first summer receives a DC link voltage command $V_{dc,cmd}$ and compares it with a measured DC link voltage, and the error is operated upon by a Proportional Integral (PI) regulator. The output of the PI regulator provides the magnitude of the command current Park vector. Later, the d-axis and q-axis components of the phase current Park vector in a synchronous reference frame are obtained using the function block (130). Each separate component is then processed by a summing means of block (132) which sums the d-axis component of the Park vector of the phase current command and the negative of the d-axis component of the Park vector of the phase current feedback, both in the synchronous reference frame. In a like fashion, block (132) also sums the q-axis component of the Park vector of the phase current command and the negative of the q-axis component of the Park vector of the phase current feedback, both in the synchronous reference frame.

Figure 4:
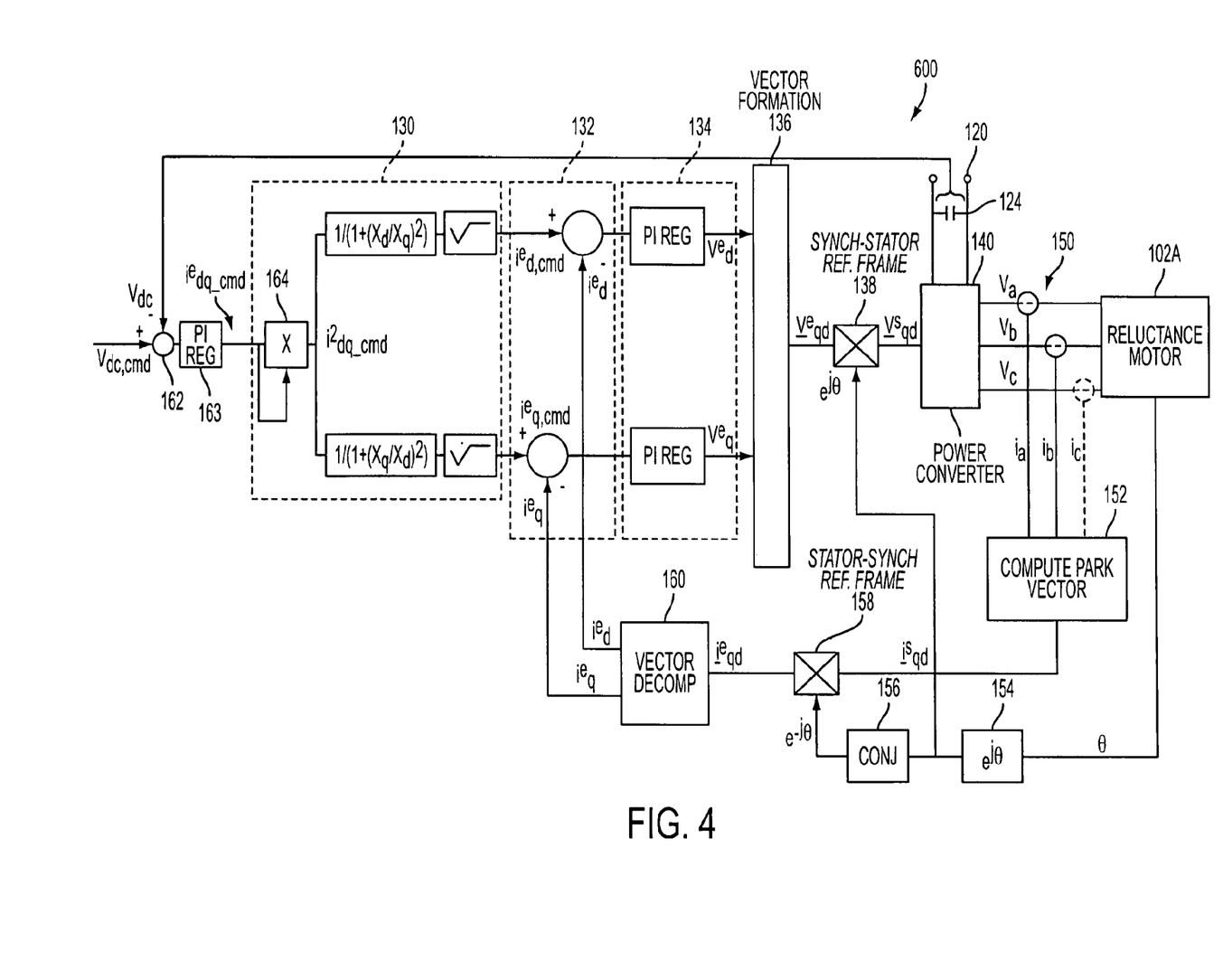
FIG. 4 is a block diagram illustrating an example of a control technique for maximized DC power production from a synchronous reluctance machine as shown in FIG. 1, or from a salient-pole synchronous machine as shown in FIG. 2 wherein excitation is lost, in accordance with an embodiment of the present invention.

The signals are then processed by block (134), a Proportional Integral (PI) regulator, which applies the d- and q-axis of the Park vector of the terminal voltage command in the synchronous reference frame using the outputs of the summing block (132), as an input to the vector formation block (136). The vector formation block (136) constructs the Park vector of the terminal voltage command using the d- and q-axis voltage components in a synchronous reference frame. The multiplier block (138), then multiplies the constructed Park vector of the terminal voltage in a synchronous reference frame with $e^{+j\theta}$ to obtain the Park vector of the terminal voltage command in a stationary reference frame. A pulse width modulated control block (140) using, for example, Space Vector Modulation (SVM), represents the power converter (110) of FIG. 1 which is coupled to the synchronous reluctance machine armature winding (12A) or to the main salient-pole synchronous machine armature winding (102A), and is used to generate a DC link voltage. This DC bus voltage is sensed and measured via the capacitor (124) voltage measurement, and is coupled to the summer (162) which provides the current command to the PI regulator (163) as described above. The output of the PI regulator (163) is coupled to block (130) which provides the d-axis and q-axis components of the vector of the phase current in a synchronous reference frame as described above.

The phase current between the converter (140) and the synchronous reluctance machine is measured by a plurality of current sensors (150), and outputs of each are then applied to block (152) to form the Park vector of the phase current in a stationary reference frame. The Park vector of the phase current in a stationary reference frame ($i^s_{qd}$) can be constructed using the three phase current sensor values. Typically, only two phase currents are measured and the Park vector, also called the space vector, of the phase current in stationary reference frame is obtained by using the following equation (5) below, $$i_{qd}^s = \tfrac{2}{3}(i_a + a i_b + a^2 i_c) = i_q^s - j i_d^s \qquad (5)$$

wherein the complex constants are $a = e^{j2\pi/3}$ and $a^2 = e^{j4\pi/3}$.

The Park vector of the phase current in a stationary reference frame is transferred to a synchronous reference frame by then multiplying by $e^{-j\theta}$ using a multiplier at block (158). The angle of the rotor of the reluctance machine as defined by the radial line of the rotor passing through the center of the salient-pole and the center line of the "A" phase stator coil, is determined and provided to block (154) thereby generating $e^{+j\theta}$. The $e^{+j\theta}$ value is coupled with multiplier block (138) to obtain the Park vector of the terminal voltage command in a stationary reference frame, and the $e^{-j\theta}$ value is coupled with multiplier block (158) to transfer the Park vector of the phase current in a stationary reference frame to a synchronous reference frame.

Block (160) then takes the Park vector of the current in synchronous reference frame and outputs d-axis and q-axis components in synchronous reference frame to the summing block (132). Here, a true current value is compared with a commanded value determined from block (130). In this case, rotor position information is sensed through rotor sensors, however, as known to those skilled in the art, a "sensorless" rotor scheme can also be used where rotor speed information and corresponding angle $\theta_{est}$ are estimated, and used for the reference frame transformations.

During the operation of the control block diagram (600), an input command of the Park vector of phase current $i^e_{qd\_cmd}$ is divided into two components, $i^e_{q\_cmd}$ and $i^e_{d\_cmd}$ such that the d-axis and q-axis voltage drop terms are equal, as in equation (6) below.

$$i_{d\_cmd}^e * X_d = i_{q\_cmd}^e * X_q \qquad (6)$$

Each current command is compared to its own feedback current, and the error signals are operated upon by the Proportional Integral (PI) regulators of (134). The output of the current regulators of (134) are then assembled into a vector at (136) to form the Park vector of the terminal voltage, and transformed back to the stationary reference frame by multiplying the voltage vector by the unit vector $e^{+j\theta}$ at (138), where theta is the angle of the rotor as defined by the radial line of the rotor passing through the center of the salient-pole and the center line of the "A" phase stator coil.

The current reference is derived from the PI regulator (163). The reference voltage, for example 270 volts, is summed with the actual DC link capacitor voltage feedback, and operated upon by the transfer function of the VDC regulator, preferably comprising a PI regulator. The power generated by the control system of FIG. 4 is maximized by maintaining the angle of the machine voltage vector at substantially 45 degrees. However, as described in greater detail below, a general application can also be provided wherein the machine voltage vector is varied.

Figure 5:
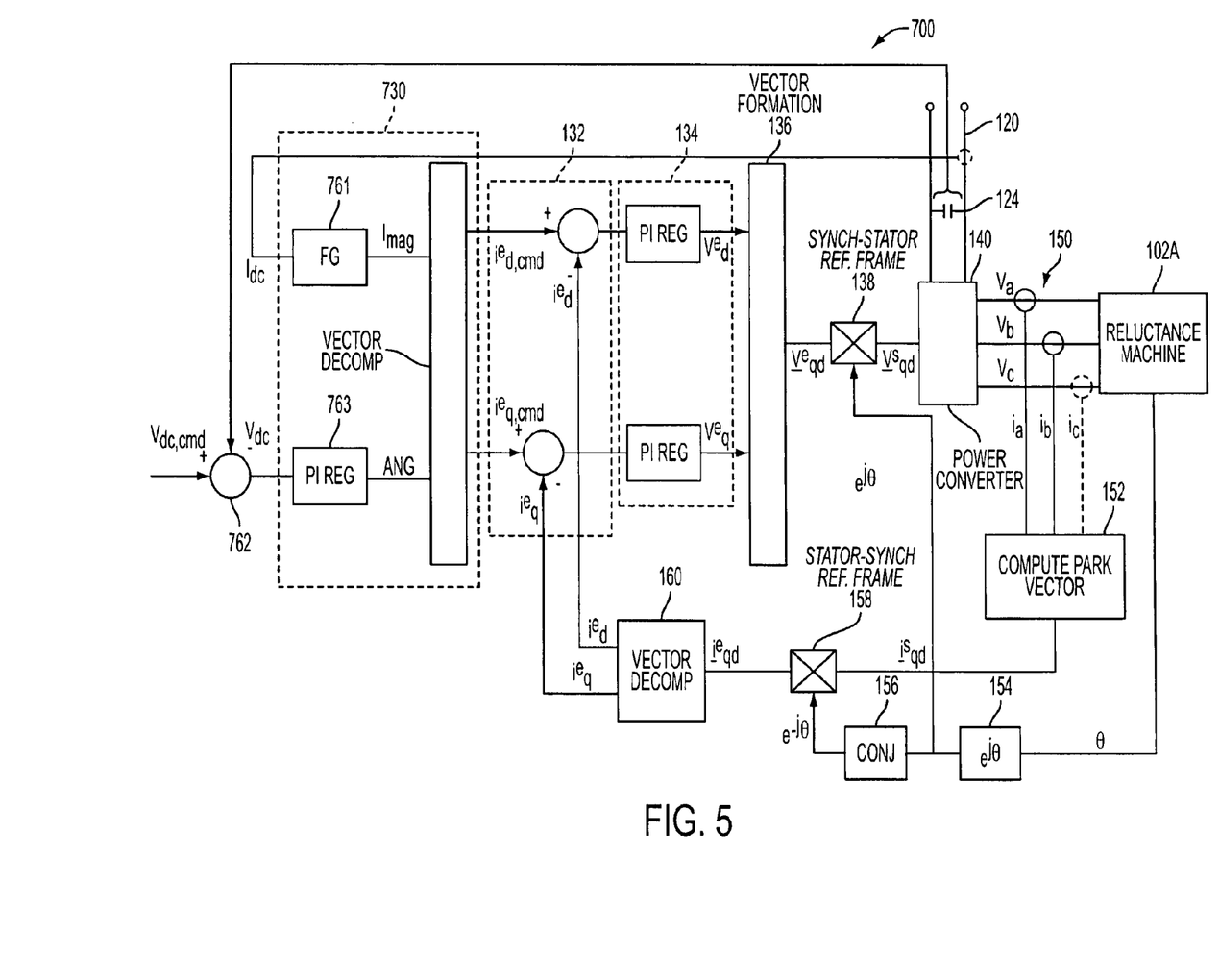
FIG. 5 is a block diagram illustrating an example of a generalized control technique for DC power production from a synchronous reluctance machine as shown in FIG. 1, or from a salient-pole synchronous machine as shown in FIG. 2 wherein excitation is lost, in accordance with another embodiment of the present invention.

In FIG. 5, a control block diagram of a controller (700) is shown in accordance with another embodiment of the present invention. In this control scheme, the minimum inverter current to produce a specific power as described in FIG. 4, is no longer used as the control algorithm. Instead, the amplitude of the DC load current is used to provide a magnitude command Imag to the vector decomposition block of (730), and the DC voltage (PI) regulator (763) is used to derive the angle of the machine voltage vector (Ang) in relationship to the reference axis. In an exemplary embodiment of the present invention, the output of the PI regulator (763) is limited to 45 degrees.

In the controller (700), the first block (730) computes the Park vector of the desired machine current in polar co-ordinates, in the synchronous reference frame, and then coverts this Park vector to the Cartesian co-ordinate system where the d- and q-axis currents are computed.

A DC bus current is sensed and measured at the DC link or bus (120) of the power converter (140), and is coupled to the function generator (761). The output of the function generator (761) is the magnitude command for the current Park vector. Similarly, a DC link voltage is sensed and measured at the DC link or bus (120) of the power converter (140), and is coupled to a summer (762) which is fed to a PI regulator (763). That is, DC bus (120) voltage is sensed and measured via a capacitor (124) voltage measurement, and is coupled to a summer (762) which provides a current command to the PI regulator (763). The output of the PI regulator (763) is the angle of the current Park vector command. The output of the PI regulator (763) and output of the function generator (761) are coupled to a vector decomp block of block (730) which provides the d-axis and q-axis components of the vector of the phase current in a synchronous reference frame as described above. In yet other embodiments of the present invention, (761) can be reversed with the closed loop formed by (762) and (763) to achieve the same goals. That is, the function generator (761) can be used to generate the angle of the current Park vector command, and the summing junction (762) and PI regulator (763) can be used to generate the magnitude command for the current Park vector. The remaining elements of FIG. 5 are as described above in regard to FIG. 4.

Regarding the prime mover "startup" mode of operation, where electrical torque is required to accelerate the prime mover (116) to enable start up of the main engine or APU, the motoring reluctance torque can be used to achieve such start up in applications where sufficient torque can be generated.

In embodiments of the present invention described above, the reluctance torque generation capability of a synchronous reluctance machine or a salient-pole synchronous machine is used to achieve both electric power generation, as well as prime mover start-up. The embodiments provide DC power production capability by using a synchronous reluctance machine and a power converter. The embodiments can also provide at least partial power generation capability by using the reluctance power of a salient-pole synchronous machine where the prime mover is operational, i.e. rotating, and can be used for both APU and main engine generators Although only a few exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention as defined in the following claims and their equivalents.

What is claimed is:

1. A system for reluctance power production using a synchronous reluctance machine, comprising:
   a power converter;
   at least one of a DC link voltage measurement means for measuring a DC link voltage and a DC load current measurement means for measuring a DC load current, wherein at least one of said measured DC link voltage and said DC load current is used to control said power converter; and
   a synchronous reluctance machine for use with a prime mover, wherein said synchronous reluctance machine is electrically coupled with said power converter and driven by said prime mover for generating reluctance DC power by reason of different magnetic reluctance between direct and quadrature axes of said driven synchronous reluctance machine and the control of said power converter.

2. A system for reluctance power production as claimed in claim 1, wherein said synchronous reluctance machine comprises:
   a rotor having a saliency and which rotates when driven by said prime mover; and
   an armature winding, wherein said armature winding is electrically coupled to said power converter.

3. A system for reluctance power production as claimed in claim 1, where said synchronous machine comprises a salient-pole synchronous machine and said controller is configured to:
   monitor a main field flux in said salient-pole synchronous machine to detect a loss of excitation power;
   monitor said prime mover engaged with said salient-pole synchronous machine to detect machine rotor rotation; and
   control said power converter using at least one of said measured DC link voltage and said DC load current to generate reluctance DC power from said salient-pole synchronous machine when there is a loss of excitation power and machine rotor rotation is detected.

4. A system for reluctance power production as claimed in claim 3, wherein said prime mover rotor rotation detection is provided by at least one rotor sensor.

5. A system for reluctance power production as claimed in claim 3, wherein said prime mover rotor rotation detection is based upon an estimate of rotor information.

6. A system for reluctance power production as claimed in claim 1, further comprising:
   a voltage sensor for measuring said DC link voltage at an output of said power converter and a summer for summing said measured DC link voltage with a commanded DC link voltage $V_{dc,cmd}$ to create a Park vector of phase current $\underline{i}^e_{qd\_cmd}$ command; and
   a first function block for dividing said Park vector of phase current $\underline{i}^e_{qd\_cmd}$ command into two current commands, $i^e_{q\_cmd}$ and $i^e_{d\_cmd}$ such that the d-axis and q-axis voltage drop terms are equal.

7. A system for reluctance power production as claimed in claim 6, further comprising:
   a comparator for comparing each current command to a feedback current and a vector formation block for using error signals of said comparison to form a Park vector of a terminal voltage; and
   a multiplication block for transforming said Park vector of a terminal voltage to a stationary reference frame for controlling said power converter.

8. A system for reluctance power production as claimed in claim 1, further comprising:
   a current sensor for measuring said DC load current at an output of said power converter, wherein said DC load current is used to provide a magnitude command Imag;
   a voltage sensor for measuring said DC link voltage at an output of said power converter, wherein said DC link voltage is used to provide an angle command of a machine voltage vector (Ang) in relationship to a reference axis, wherein said angle is limited to substantially 45 degrees; and
   a first function block for dividing the input magnitude command Imag and angle command into two current commands, $i^e_{q\_cmd}$ and $i^e_{d\_cmd}$.

9. A system for reluctance power production as claimed in claim 8, further comprising:
   a comparator for comparing each current command to a feedback current and a vector formation block for using error signals of said comparison to form a Park vector of a terminal voltage; and
   a multiplication block for transforming said Park vector of a terminal voltage to a stationary reference frame for controlling said power converter.

10. A system for reluctance power production comprising:
    a salient-pole synchronous machine; and
    a controller configured to:
    monitor a main field flux in a salient-pole synchronous machine to detect a loss of excitation power;
    monitor a prime mover engaged with said salient-pole synchronous machine to detect machine rotor rotation; and
    control a power converter using at least one of a measured DC link voltage and a measured DC load current to generate reluctance DC power from said salient-pole synchronous machine when there is a loss of excitation power and machine rotor rotation is detected.

11. The system of claim 10 wherein measured DC load current is used to generate reluctance DC power from said salient-pole synchronous machine when there is a loss of excitation power and machine rotor rotation is detected.

12. The system of claim 10 wherein measured DC link voltage is used to generate reluctance DC power from said salient-pole synchronous machine when there is a loss of excitation power and machine rotor rotation is detected.

13. The system of claim 10, wherein said prime mover rotor rotation detection is provided by at least one rotor sensor.

14. The system of claim 10, wherein said prime mover rotor rotation detection is based upon an estimate of rotor information.

15. A start-up system for an aircraft engine comprising a synchronous reluctance machine that is also used for power generation on the aircraft; wherein the synchronous reluctance machine comprises:
    a power converter; and
    a synchronous reluctance machine for use with a prime mover, wherein said synchronous reluctance machine is electrically coupled with said power converter and driven by said prime mover for generating reluctance DC power by reason of different magnetic reluctance between direct and quadrature axes of said driven synchronous reluctance machine and the control of said power converter.

16. The start-up system of claim 15 wherein the synchronous reluctance machine comprises of at least one of a DC link voltage measurement means for measuring a DC link voltage and a DC load current measurement means for measuring a DC load current, wherein at least one of said measured DC link voltage and said DC load current is used to control said power converter.

17. The system of claim 15, wherein the synchronous reluctance machine comprises:
  a rotor having saliency and which rotates when driven by said prime mover; and
  an armature winding, wherein said armature winding is electrically coupled to said power converter.

18. A start-up system for an aircraft engine comprising a salient-pole synchronous machine that is also used for power generation on the aircraft; wherein the salient-pole synchronous machine comprises:
  a controller configured to:
   monitor a main field flux in said salient-pole synchronous machine to detect a loss of excitation power;
   monitor said prime mover engaged with said salient-pole synchronous machine to detect machine rotor rotation; and
   control said power converter using at least one of a measured DC link voltage and a measured DC load current to generate reluctance DC power from said salient-pole synchronous machine when there is a loss of excitation power and machine rotor rotation is detected.

19. The system of claim 18 wherein measured DC load current is used to generate reluctance DC power from said salient-pole synchronous machine when there is a loss of excitation power and machine rotor rotation is detected.

20. The system of claim 18 wherein measured DC link voltage is used to generate reluctance DC power from said salient-pole synchronous machine when there is a loss of excitation power and machine rotor rotation is detected.

* * * * *